United States Patent [19]

LaValley

[11] Patent Number: 4,608,170

[45] Date of Patent: Aug. 26, 1986

[54] ANGULARLY ADJUSTABLE BREAKER VALVE-DISCHARGE ELBOW FOR ROTARY DRUM FILTERS

[75] Inventor: Richard W. LaValley, Vancouver, Wash.

[73] Assignee: LaValley Industrial Plastics, Inc., Vancouver, Wash.

[21] Appl. No.: 766,768

[22] Filed: Aug. 16, 1985

Related U.S. Application Data

[63] Continuation-in-part of Ser. No. 750,320, Jun. 28, 1985, which is a continuation-in-part of Ser. No. 737,824, May 24, 1985.

[51] Int. Cl.$^4$ ............................................. B01D 33/06
[52] U.S. Cl. ..................... 210/404; 210/392; 210/429; 162/321; 162/323; 162/334; 162/357; 162/369; 162/370
[58] Field of Search ............... 162/321, 323, 334, 357, 162/369, 370; 210/217, 392, 402, 403, 404, 429, 430, 784

[56] References Cited

U.S. PATENT DOCUMENTS

| | | | |
|---|---|---|---|
| Re. 27,326 | 4/1972 | Sheaffer | 210/404 |
| 915,436 | 3/1909 | Hencke | 210/404 |
| 2,052,156 | 8/1936 | Young | 210/404 |
| 3,363,774 | 5/1965 | Luthi | 210/404 |
| 3,452,874 | 7/1969 | Keller | 210/404 |
| 3,630,380 | 12/1971 | Barnebl | 210/404 |
| 4,056,475 | 11/1977 | Sander | 210/402 |
| 4,154,687 | 5/1979 | LaValley | 210/404 |
| 4,383,877 | 5/1983 | LaValley | 210/404 |
| 4,419,165 | 12/1983 | LaValley | 210/404 |

Primary Examiner—Ernest G. Therkorn
Attorney, Agent, or Firm—Klarquist, Sparkman, Campbell, Leigh & Whinston

[57] ABSTRACT

A vacuum breaker valve-discharge elbow assembly for a rotary drum filter of the pipe machine type is adjustably mounted to the drive gear housing for the filter via a separate mounting plate. A valve flange comprising a separate clamping ring clamps the valve to the mounting plate. The mounting plate is in turn transversely and axially adjusted on the gear housing via adjusting bolts to accurately seat the valve within its valve housing in the drum. The discharge elbow is then secured to the mounting plate independently of the valve. The valve can be rotationally adjusted without limitation on the mounting plate without disturbing the prior axial and transverse adjustment of the plate and valve by loosening the clamping ring to enable rotation of the valve along close-tolerance guide surfaces of the mounting plate. Cooperative calibration plate and pointer on adjacent surfaces of the valve body and packing collar facilitate precise angular adjustment of the valve.

21 Claims, 7 Drawing Figures

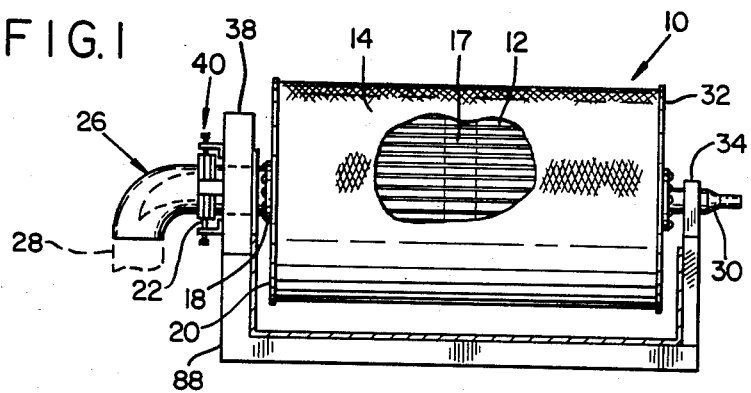
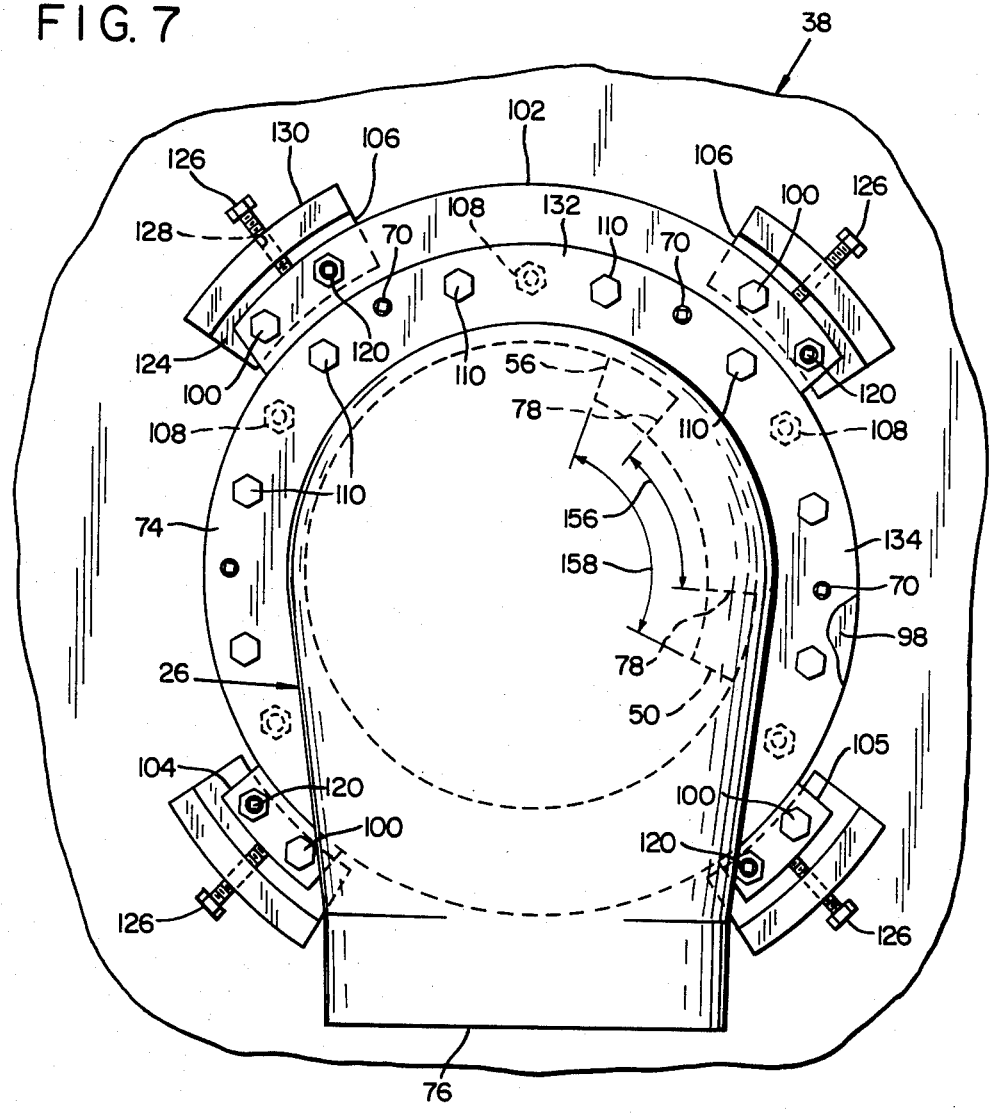

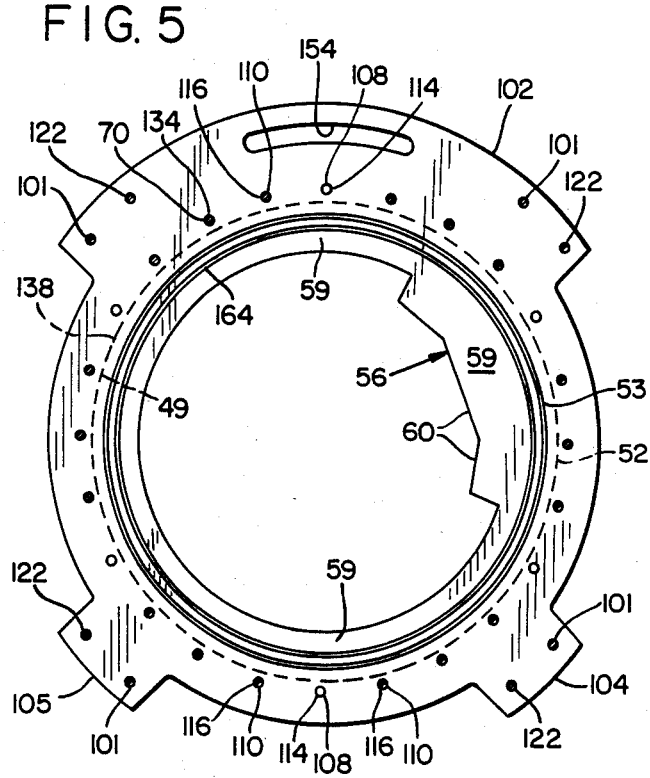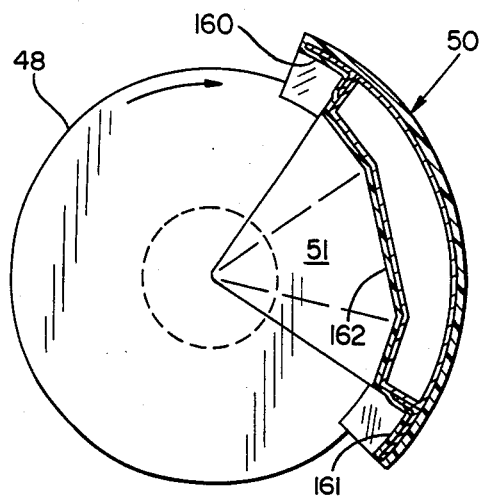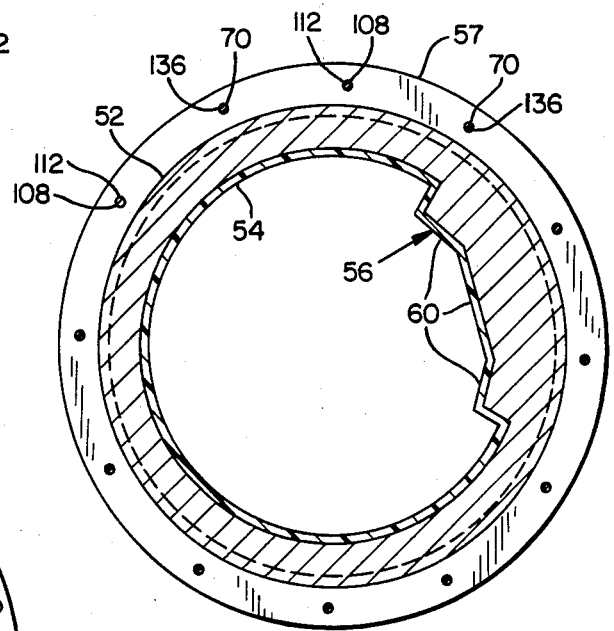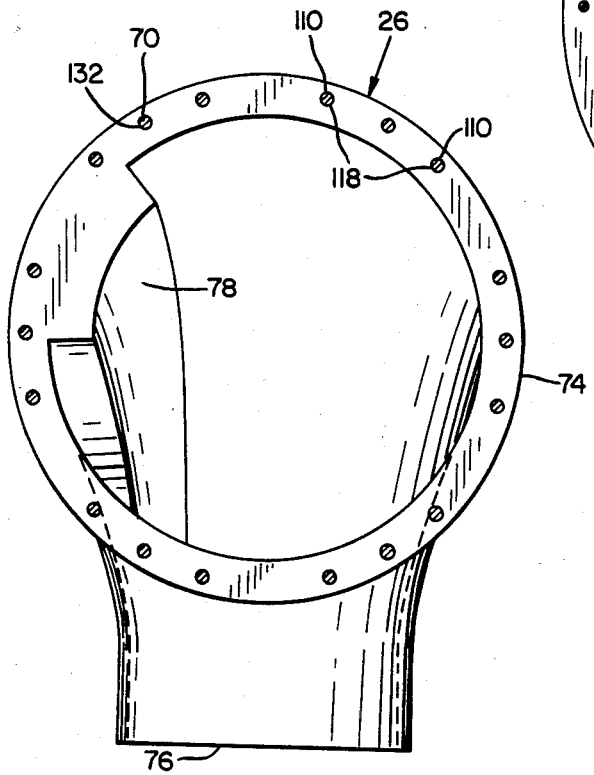

ANGULARLY ADJUSTABLE BREAKER VALVE-DISCHARGE ELBOW FOR ROTARY DRUM FILTERS

RELATED APPLICATIONS

The present application is a continuation-in-part of co-pending allowed application Ser. No. 750,320, filed June 28, 1985, for Adjustable Mounting For Valve-Discharge Elbow of Rotary Drum Filter, which is in turn a continuation-in-part of co-pending application Ser. No. 737,824, filed May 24, 1985 for improved vacuum breaker-discharge elbow for filter drums.

FIELD OF THE INVENTION

The present invention relates to rotary drum filters used in the pulp and papermaking industry to form a mat of wood pulp and separate the mat from its filtrate. The invention relates especially to such filters of the pipe machine type in which there is a vacuum breaker valve and discharge elbow assembly at one end of the drum filter for controlling the application of suction to the filter surface and the drawing of filtrate from the mat and drum. More particularly, the invention relates to an improved angularly adjustable breaker valve for the breaker valve-discharge elbow assembly for such a drum filter.

BACKGROUND OF THE INVENTION

A drum filter of the pipe machine type comprises a rotary drum partially submerged in a tank of pulp slurry. Typically, the drum has axially extending filtrate channels spaced about its peripheral surface defined by ribs and covered by a filter screen. The surface filtrate channels communicate with an external source of subatmospheric pressure, or suction, through drainage pipes, an annular valve housing mounted centrally within the discharge end of the drum, a stationary vacuum breaker valve member seated within the valve housing and extending therefrom, and a discharge elbow connected to the outlet end of the valve member. The stationary valve member has a valve closure segment which blocks off a section of multiple discharge ports in the valve housing to control the application of subatmospheric pressure to the connected drainage pipes and surface filtrate channels.

As the drum rotates about its axis with suction applied, the screen rotates through the pulp slurry and collects a wet mat or "cake" of fibres from the slurry. As the screen emerges from the tank, filtrate is drawn from the mat through the screen and filtrate channels into the drainage pipes, and from there through the valve housing and into the valve member and discharge elbow to remove the filtrate from the drum. During rotation of the drum, the stationary valve closure segment cuts off suction to the filtrate channels in a segment of the drum surface, thereby enabling removal of the pulp mat from the screen surface, usually with the aid of a doctor device.

Rotary drum filters of the described pipe machine type are shown, for example, in U.S. Pat. No. 3,363,774 to Luthi and U.S. Pat. No. 4,383,877 to LaValley.

Typically, the stationary valve member for such a drum filter, partially shown in FIG. 7 of the Luthi patent, has a cylindrical valve plug at its inlet end which is seated within the valve housing. A conically tapered valve closure segment extends rearwardly from the plug to cover a portion of the valve housing outlet ports to block them from the source of suction. A large central shaft extends rearwardly from the plug and outwardly beyond the discharge end of the drum, connecting with an annular flange and sealing rim at the outlet end of the valve member, such outlet end portion not being shown in the Luthi patent. Usually, a hollow generally cylindrical drive trunnion or shaft connected to the drum surrounds the shaft portion of the valve member to define a portion of the filtrate discharge passage leading from the drum. The outlet end of the valve member joins an inlet end of the discharge elbow at respective flanges, bolted together. The outlet end of the elbow, in turn, connects to a suction pipe leading to the source of subatmospheric pressure. The drive trunnion or shaft is enclosed within a stationary drive housing, shown in the vicinity of item 24 in FIG. 1 of the Luthi patent. The drive housing houses the drum drive means, typically a worm gear or chain drive.

The drive housing typically is part of the drum support structure and serves as a support for the valve member. A flange on the discharge elbow bolts to the valve flange to form the valve-elbow assembly. Ears on the elbow flange bolt to the drive housing to support the valve-elbow assembly on the drive housing. However, seating of the valve closure segment precisely within the drum's valve housing is critical. Therefore means must be provided for adjusting the position of the elbow flange both axially and transversely of the valve member on the drive housing to achieve proper seating of the segment. Such means usually include both axial and radial adjustment bolts acting between the elbow flange and the drive housing.

Proper seating of the valve closure segment is complicated by the fact that the valve member and discharge elbow must be securely bolted together at their flanges when the seating adjustment is made because the elbow flange connects the valve member to the drive housing. When the elbow is connected to the valve member, access to the valve housing and segment end of the valve member is extremely limited, making accurate seating difficult and tedious. Seating can only be accomplished through trial and error using a feeler gauge affixed to a long stick inserted through a small inspection port in the elbow.

Rotational adjustment of the valve closure segment relative to the valve housing is also important to ensure that the drum surface is cut off from suction to enable removal of the mat at a precise angular position of such surface during drum rotation. However, with the valve member supported from the drive housing by the elbow flange, precise rotational adjustment of the valve segment is also difficult and tedious because of the access problems previously described. In addition, many types of prior valve-discharge elbow assemblies do not accomodate rotational valve adjustment at all, at least not without their complete disassembly.

The present invention is an improvement of the method and means disclosed in the prior co-pending allowed application Ser. No. 750,320, for solving the foregoing problems. The valve-discharge elbow assembly and mounting of such prior application is limited in the degree of angular adjustment of the valve closure segment permitted, both because of the reliance on bolt slots at the joints of the assembly and the design of the valve closure segment to achieve such adjustment. Such prior assembly and mounting also requires two fluid-sealed joints at the juncture of the elbow and valve, which doubles the opportunity for fluid leakage at these joints. The assembly and method of the present invention provide a much greater rotational adjustment capability than the prior assembly and method, and require only a single fluid-sealed joint between elbow and valve, while retaining all of the advantages of such prior assembly and method.

In view of the foregoing, primary objectives of the present invention are to provide:

1. an improved method and means for seating and rotationally adjusting the valve member in the valve housing of a rotary drum filter;

2. an improved method and means for mounting a valve-discharge elbow assembly that simplifies, speeds up, and renders more accurate, the seating and rotational adjustment of the valve member in the valve housing of a rotary drum filter as compared to prior such methods and means;

3. an improved valve closure segment configuration which increases the practical limits of rotational adjustment of the valve member; and 4. an improved method and means for assembling and mounting a vacuum breaker valve and a discharge elbow which reduces to one the number of fluid seals required at the joint between the elbow and valve.

More specific objectives of the present invention include the provision of an improved method and means for mounting a valve-discharge elbow assembly to a rotary drum filter which enable (a) seating of the valve member while the discharge elbow is removed from the valve member, (b) rotational adjustment of the valve member with the elbow either connected to or disconnected from the valve member as desired; (c) rotational adjustment of the valve member without the need for access to the valve housing and without the use of a feeler gauge; (d) rotational adjustment of the valve member without the need for reseating it; (e) removal of the discharge elbow from the valve-elbow assembly for valve inspection or adjustment without the need for reseating or readjusting the valve upon reassembly of the valve and elbow; (f) unlimited rotational adjustment of the valve member; (g) a simplified fluid-sealing joint between the discharge elbow and breaker valve; and (h) a reduction in the number of assembled parts which must be provided with a continuation of the valve closure segment.

SUMMARY OF THE INVENTION

The foregoing objectives are carried out in accordance with the present invention primarily through the provision of an improved method and means for mounting the valve-discharge elbow assembly to the stationary drive housing of a rotary drum filter, and secondarily through provision of an improved valve closure segment configuration. The improved mounting, in turn, provides an improved method and means for seating and rotationally adjusting the valve member in the valve housing. Such methods and means are characterized by one or more of the following features:

1. Both the valve member and the discharge elbow are independently connected to a common but separate, intermediate mounting plate means. The mounting plate means, in turn, is connected to the drive housing, thereby to mount both the valve member and the elbow to the drive housing, but independently of one another. The mounting plate means may comprise a mounting ring which surrounds the discharge end of the valve member so that such discharge end makes direct contact with the inlet end face of the discharge elbow.

2. Adjusting means are provided for both axially and transversely adjusting the mounting plate means relative to the drive housing while the valve member is secured to the mounting plate means but the discharge elbow is disconnected from such plate means, thereby enabling seating of the valve member within the valve housing with the discharge elbow removed.

3. Means may be provided for rotationally adjusting the valve member while the mounting plate means remains adjustably secured to the drive housing and the valve member remains connected to the mounting plate means. This feature enables rotational adjustment of the valve without the need to reseat the valve and with the elbow either removed from or connected to the mounting plate means as desired. Such means may include a clamping means separate from the valve member for clamping a peripheral portion of the valve member to the mounting plate means. The clamping means may comprise a clamping ring. The mounting plate, clamping ring, or both, may be provided with an annular guide surface for guiding rotational adjustment of the valve member relative to the mounting plate means without disturbing transverse adjustment of the valve.

4. The rotational adjustment means for the valve member may include calibration and cooperative indexing means on juxtaposed peripheral portions of the valve member and a relatively stationary portion of the assembly such as the packing collar, clamping ring or mounting plate. This feature enables precise angular adjustment of the valve segment within the valve housing without the need for access to the valve housing and while the valve and discharge elbow remain assembled and adjustably secured to the drive housing.

5. The rotational adjustment means may include a valve closure segment having opposite side flange extensions which extend the valve closure arc to increase the practical limits of rotational adjustment of the valve. These flange extensions, or portions thereof, may be removed from the valve after adjustment so as not to interfere with valve function.

6. Means may be provided for connecting and disconnecting the discharge elbow from the mounting plate means without disconnecting the plate means from the drive housing and without disconnecting the valve member from the plate means. This feature enables access to the interior of the valve member for inspection or maintenance while the discharge elbow is removed and without disturbing the seating or rotational adjustment of the valve member in the valve housing.

7. The valve-discharge elbow assembly may include the unique structural features disclosed more particularly in the aforementioned co-pending allowed application Ser. No. 737,824, filed May 24, 1985 wherein the assembly defines a streamlined discharge flow path for the filtrate liquid. Such assembly is characterized by a valve member which includes a structural extension of the major portion of the valve closure segment throughout the length of the valve member to structurally interconnect the valve segment and valve discharge end portion. The discharge elbow may include a continuation of such valve segment extension, but with the segment continuation diminishing progressively in angular and radial extent from the inlet end of the discharge elbow in a direction toward its outlet end. If the mounting plate means is in the form of a ring surrounding the valve member, such ring need not include a corresponding segment, but in any case there is a continuation of the arcuate segment throughout the valve member and transition to the discharge elbow. The elbow segment may be of an angular extent which is less than the angular extent of the valve closure segment such that rotational adjustment of the valve member relative to the elbow will not present any downstream flow obstruction in the flow passage.

The foregoing and other objects, features and advantages of the present invention will become more apparent from the following detailed description which proceeds with reference to the accompanying drawings.

BRIEF DESCRIPTION OF THE DRAWINGS

FIG. 1 is a somewhat schematic front elevational view of a rotary drum filter including a valve discharge elbow assembly and drive mounting in accordance with the invention;

FIG. 3 is a view taken along the line 3—3 of FIG. 2 showing the valve clamping ring and a discharge end portion of the valve member;

FIG. 4 is a view taken along the line 4—4 of FIG. 2 showing the elbow connecting flange portion of the discharge elbow.

FIG. 5 is a view taken along the line 5—5 of FIG. 2 showing the mounting plate and a discharge end portion of the valve for the valve-discharge elbow assembly;

FIG. 6 is a sectional view taken along the line 6—6 of FIG. 5; and

FIG. 7 is a view, partly broken away, of the valve-discharge elbow assembly as viewed from the line 7—7 of FIG. 2.

DETAILED DESCRIPTION OF A PREFERRED EMBODIMENT

General Arrangement

Figure 2:
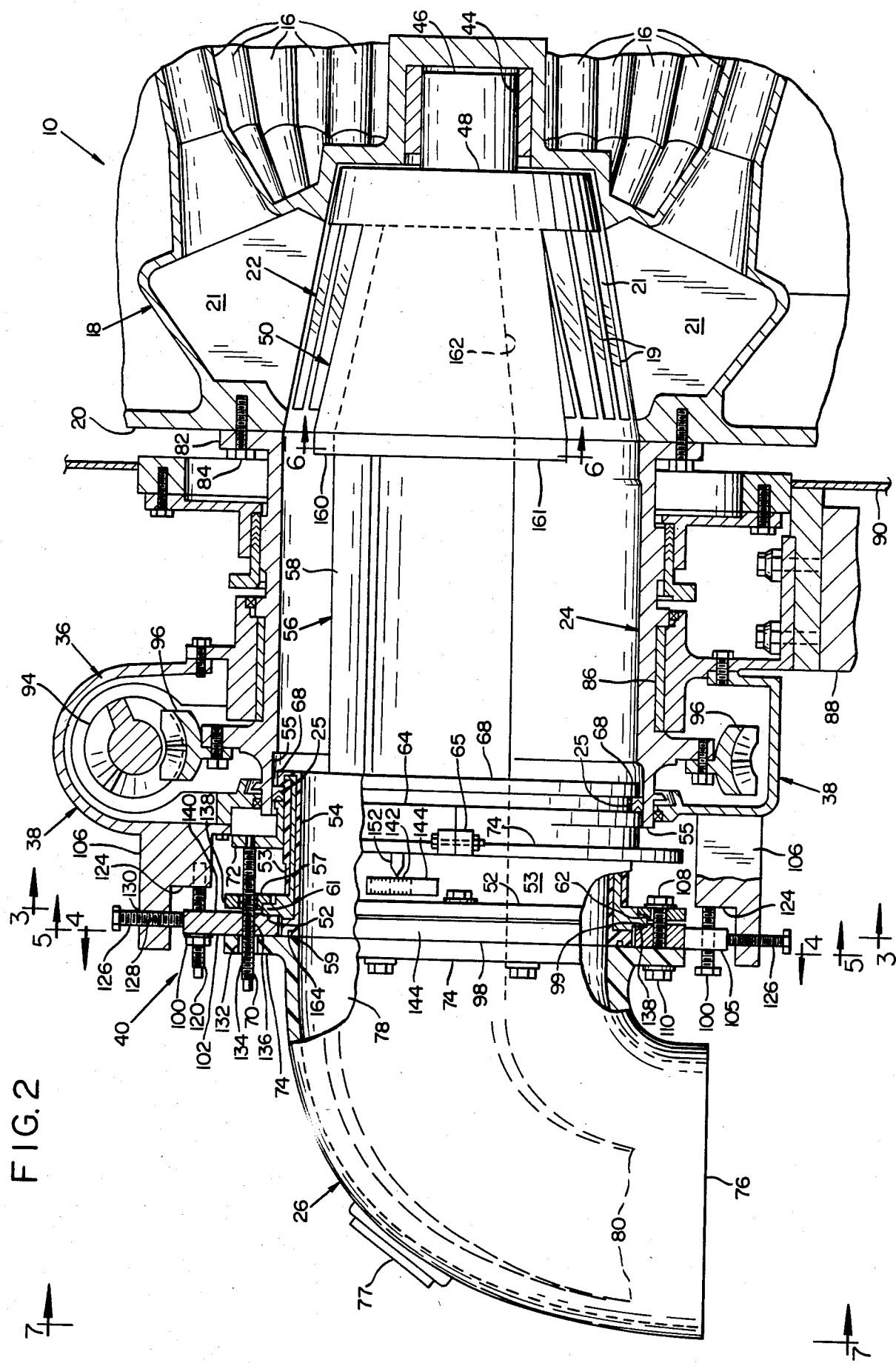
FIG. 2 is an enlarged elevational view, partly in section, of the discharge valve end portion of the drum filter of FIG. 1 showing the mounting details of the discharge elbow-valve assembly.

With reference to FIGS. 1 and 2, a rotary drum filter 10 of the pipe machine type includes a cylindrical surface with longitudinally-extending filtrate channels 12 covered with a filter screen 14. The filtrate channels drain into various drainage pipes 16 (FIG. 2) which lead from intake openings 17 at a central portion of the cylindrical surface to an annular valve housing 18 at a discharge end 20 of the drum. A stationary valve member 22 extends into the valve housing 18 through a hollow rotary drive trunnion 24 connected to end 20 of the drum. Stationary valve member 22 in turn joins a discharge elbow 26 which is connected at its downstream end to a suction pipe 28 leading to a source of subatmospheric pressure (not shown).

Hollow drive trunnion 24 and a tail shaft 30 at opposite end 32 of the drum rotatably support the drum for rotation about its axis on stationary drum support pedestal means 34. The drum is rotated about its axis through an appropriate drive, such as the worm gear drive 36 housed within the stationary gear housing 38 at the discharge end of the drum and driven by a motor (not shown). The stationary drive housing, part of the drum support means, serves to support the outlet end of valve member 22 and inlet end of discharge elbow 26 through an appropriate connection indicated generally at 40.

As shown in FIG. 2, annular valve housing 18 is partitioned by radially extending ribs 19 into chambers 21 which communicate with drainage pipes 16 and define outlet ports for discharging filtrate from the drum. Filtrate leaves the drum through valve member 22, surrounding hollow drive trunnion 24 and discharge elbow 26. The same elements communicate subatmospheric pressure from the source to the drum surface filtrate channels 12 as permitted by the stationary valve member 22.

Vacuum Breaker Valve

Valve member 22 comprises a unitary valve body including a tapered inlet end portion seated within valve housing 18, and a spaced annular outlet end portion interconnected by an intermediate portion extending within drive trunnion 24.

The inlet end portion includes a journal shaft 46 which rotatably supports the valve body within a bearing sleeve 44 of valve housing 18 and projects forwardly from a conically tapered valve plug 48. A conically tapered valve closure segment 50 extends rearwardly from plug 48. Segment 50 is sized and shaped to fit closely within the conical valve housing space defined by the radially inner edges of valve housing ribs 19 to block off a selected segment of the valve chambers 21 defined by such ribs from the source of vacuum. A major interior portion of the conically tapered segment may be filled in between plug 48 and closure segment 50 to provide a reinforcing gusset 51 therebetween as shown in FIG. 6.

The annular outlet end portion of the valve body includes a valve connecting means in the form of an integral annular valve connecting flange 52 and separate clamping means in the form of an annular clamping plate or ring 56. Such outlet portion also includes an annular sealing rim 54 extending toward the drum from the flange and having a cylindrical exterior surface 53. This surface cooperates with an overlapping sealing flange 55 of drive trunnion 24 and conventional packing material 25 therebetween to form a fluid seal between the stationary sealing rim of the valve member and the rotating drive trunnion 24. A split packing gland collar 64 closed by screw-adjustable tightener 65 urges the packing 25 against a stop lip 68 of sealing rim 54 under the influence of adjusting bolts 70 acting against a flange 72 of the collar to expand the packing into fluid-sealing engagement between the trunnion and sealing rim.

The intermediate portion of the valve body comprises a cylindrically curved extension segment 56 which forms a rearward continuation of conically curved valve closure segment 50. The extension segment structurally interconnects the valve closure segment at the inlet end and the valve flange 52 and sealing rim 54 portions at the outlet end of the valve member, and is the only structural interconnection therebetween. The exterior surface 58 of the extension segment is cylindrically curved, and the interior surfaces 60 of such segment are generally concave (FIG. 3), although the configuration of such interior surfaces may vary somewhat so long as they define a substantially streamlined flow path. This will be most apparent from the disclosure of the aforementioned co-pending applications which are incorporated herein by reference.

The interior surface of the extension segment cooperates with a portion of the interior surface of surrounding drive trunnion 24 to define a major portion of the filtrate discharge flow passage through the valve body. From the aforementioned co-pending applications and FIGS. 3 and 5 it will also be apparent that the cross sectional shape of the flow passage through the valve body will be generally that of a segmented circle and is generally streamlined, there being substantially no abrupt changes in cross-sectional area of the flow passage from one end of the valve member to the other, and no substantial interior obstruction of such passage in the valve member. Extension segment 56 extends continuously from its juncture with valve closure segment 50 to the valve discharge end face 59, thereby serving as a structural support for the sealing rim and valve flange.

Discharge Elbow

Discharge elbow 26 defines a continuation of the flow passage defined by the valve body. The discharge elbow includes a connecting means at its inlet end in the form of an elbow connecting flange 74. This flange is used in a manner to be described, in conjunction with the mounting plate 98 and clamping ring 57, to interconnect the valve member and discharge elbow to form the valve-discharge elbow assembly. The discharge elbow also includes outlet end 76 which is normally received within the inlet end of suction tube 28 (FIG. 1). The elbow curves smoothly from its horizontally-directed inlet end to its vertically-directed outlet end, forming a smoothly-curving flow passage to minimize turbulence and energy loss within the elbow as described more particularly in the aforementioned co-pending applications. The elbow may also be provided with an inspection port 77.

The flow passage at the inlet end of the discharge elbow has generally the same segmented cross sectional shape and substantially the same cross sectional area as the flow passage at the outlet end of the valve member. This is achieved through the provision of an elbow segment 78 which forms a continuation of the valve extension segment. However, in the downstream discharge direction within the elbow, the elbow segment 78 diminishes progressively both in angular or circumferential extent and in radial extent such that it disappears at point 80. Thus there is a gradual transition of the cross sectional shape and area of the flow passage within the elbow from that of a segmented circle to that of a full circle at outlet 76. Moreover, the cross sectional area of the flow passage at the outlet end of the valve is substantially the same as its area at the inlet end of the elbow. This feature ensures that there is no abrupt change in cross sectional area of the flow path from the valve member to the elbow which could otherwise cause substantial head loss at this point. Moreover, the smoothly curving elbow minimizes head loss as the flow path changes direction in the elbow.

As described thus far, the valve member and related discharge elbow are substantially as described with respect to co-pending application Ser. No. 737,824. However, the manner in which the valve and discharge elbow are assembled together, adjusted, and mounted to the stationary gear casing for the drum filter is markedly different from that employed in other known valve-discharge elbow assemblies.

Rotary Drum Drive and Mounting

Rotary drive trunnion 24 incudes a flange 82 through which bolts 84 attach the trunnion to discharge end 20 of the drum filter. The trunnion in turn is rotationally supported by a bearing 86 at the upper end of a trunnion support 88 just outside the end wall 90 of a vat which retains the pulp slurry and receives lower surface portions of the drum filter.

In the illustrated embodiment of FIG. 2, the drive means for driving the trunnion and thus the drum includes a worm gear 94 within gear housing 38. The worm gear drives a ring gear 96 attached to the trunnion, and the ring gear is also housed within gear housing 38. Gear housing 38 is secured to the upper end of drum support 88.

Although there is a rotary seal as previously described between the drive trunnion and the sealing rim of the valve member, the trunnion does not support the outer end of the valve member. Other means are provided for this purpose, including the stationary drum support means 88 which includes the connected gear housing 38.

Valve-Discharge Elbow Assembly and Mounting

It is usually convenient, if possible, to connect the valve-discharge elbow assembly at the interconnection of the elbow and valve to the stationary drum support means, and more specifically to the stationary gear housing of such support means. In the present invention, this is done in a unique manner as follows:

Still referring to FIG. 2, a valve mounting means in the form of a generally annular mounting plate or ring 98 is positioned between valve connecting flange 52 and elbow connecting flange 74. The mounting plate also surrounds the discharge end portion of the valve member so that its annular inner surface 99 defined by shoulder 138 provides a bearing support and guide surface for the discharge end of the valve member. The rear end face of such plate is approximately flush with the discharge end face 59 of the valve member, although the latter projects slightly beyond the plate to abut the elbow. First threaded connecting means in the form of cap screws 100 extend through an upwardly extending arcuate flange portion 102 and radially extending lower pair of ears 104, 105 of the mounting plate to threadedly secure the mounting plate to bosses 106 of gear housing 38.

Valve flange 52 is integral with the sealing rim 54 of the valve member. Clamping ring 57 is separate from but cooperates with valve flange 52 to securely clamp the valve member to mounting plate 98 so that plate and valve member can be axially and transversely adjusted together relative to the drive housing 38, thereby to properly seat the valve member in its valve housing. The clamping ring includes an annularly notched shoulder portion which defines a radially extending clamping surface 61 which engages the valve flange 52 to clamp the latter against the mounting plate, and an axially extending annular guide surface 62 concentric with the axis of the valve member for locating the clamping ring with respect to the valve and also at least partially supporting the valve flange to permit rotation of the valve member without disturbing such member's axial or transverse adjustment relative to the mounting plate. By machining annular guide surface 99 at the shoulder of the mounting plate to close tolerances, such surface can also fulfill such guide surface function, either instead of or in cooperation with the clamping ring guide surface 62.

Second threaded connecting means in the form of cap screws 108 secure clamping ring 57 to mounting plate 98, thereby clamping valve flange 52 to secure the valve member to such plate. Third connecting means in the form of additional cap screws 110 secure elbow flange 74 to mounting plate 98.

As will be apparent from a comparison of FIGS. 3, 4, and 5, valve flange 52 and elbow flange 74 are independently connected to mounting plate 98 so that each can be disconnected or loosened from the mounting plate without disconnecting or loosening the other from such plate. Six bolt holes 112 (FIG. 3) provide the clamping ring openings through which clamping ring connecting screws 108 extend through the ring into threaded engagement with tapped holes 114 at six corresponding positions on the mounting plate (FIG. 5). Offset on opposite sides of each clamping ring screw hole 114 on mounting plate 98 is a pair of tapped elbow flange screw holes 116 to receive elbow flange connecting screws 110. Untapped holes 118 (FIG. 4) are provided at locations on elbow flange 74 corresponding to the positions of tapped screw holes 116 on mounting plate 98.

It will be noted that there are twice as many elbow flange screw holes 116 in mounting plate 98 as there are clamping ring screw holes 114 in such plate. The reason is that the clamping ring is of metal construction whereas the elbow flange is entirely of fiberglass-reinforced plastic construction, the latter requiring closer centers for its connectors.

From the foregoing, it will be apparent that both the elbow flange and the valve flange 52 can be secured to the mounting plate without the other being secured to such plate. Conversely, each can be disconnected from the mounting plate without disconnecting the other from such plate or even disturbing the adjustment of the other on the plate. However, the plate serves as the medium for interconnecting the valve member and elbow to form the valve-elbow assembly and for supporting such assembly from the gear housing. Use of such plate leads to important advantages.

Because accurate seating of valve segment 50 within valve housing 18 is critical to the proper operation of the filter drum, and further because the valve member is supported primarily by mounting plate 98 from gear housing 38, adjustment of the mounting plate relative to the gear housing is critical to proper seating and adjustment of the valve member. Six horizontal adjustment bolts 120 extending through tapped holes 122 in the mounting plate top flange 102 and ears 104, 105 into abutment against vertical surfaces 124 of gear housing bosses 106, in conjunction with connecting screws 100, provide a means for axial adjustment of the mounting plate and thus the connected clamping ring and valve member relative to valve housing 18. Four radially directed adjusting bolts 126 extending through tapped holes 128 in ear extensions 130 of gear housing bosses 106 into abutment with the top surfaces of top flange extension 102 and ears 104, 105 of the mounting plate provide transverse adjusting means for the mounting plate and thus for the connected valve member 22 relative to its valve housing. This transverse adjusting feature is best shown in FIG. 7. Together, bolts 120 and bolts 126 provide valve seating means.

The previously-mentioned adjusting bolts 70 adjust the position of packing gland collar 64 on sealing rim 53 of the valve member. These bolts extend through aligned clearance holes 132, 134, respectively, in elbow flange 74 and mounting plate 98 and through tapped holes 136 in clamping ring 57 into abutment against the packing gland collar flange 72.

It is necessary for optimum performance of the drum filter that valve segment 50 be rotatably adjustable within the valve housing to some angular extent. Thus, rotational or angular valve adjustment means are provided at the connection between the valve member and mounting plate 98. Such angular adjustment means include the clamping ring 57 with its or the plate's annular guide surfaces 62, 99 precisely positioned concentrically with respect to the valve axis. With clamping ring connecting screws 108 loosened slightly, the valve flange 52 can be rotated on ring guide surface 62 (and/or alternatively on mounting plate guide surface 99), thus rotating the entire valve member about the axis of the valve member to achieve the desired angular adjustment of the valve segment in the valve housing, without limitation.

To ensure that this angular adjustment can occur without disturbing the seating adjustment of the valve member within the valve housing, mounting plate 98 remains firmly and adjustably secured to the gear housing by the adjusting and connecting means previously described. To further ensure maintenance of the seating adjustment of the valve member during its angular adjustment, the angular adjustment means further includes the annular shoulder 138 previously mentioned and defining plate guide surface 99. The central portion of the valve-facing surface 140 of the mounting plate is recessed from the outer portions thereof to form the shoulder 138. This shoulder is precision machined to receive snugly, under close tolerances, the peripheral edge of valve flange 52. Therefore, when the valve member is rotated about its axis, shoulder 138 ensures that the valve member retains its exact transverse adjustment despite the loosened clamping ring.

As previously suggested, annular plate surface 99 can provide the annular guide surface means for maintaining transverse adjustment of the valve member as the latter is rotated with clamping ring 57 loosened. Thus, guide surface 62 of the clamping ring need not be machined to close tolerances unless it is used to assist or supplant the guide function of plate surface 99.

When the desired angular adjustment is achieved, clamping ring connecting screws 108 are retightened to clamp the valve member to mounting plate 98. Because the axial and transverse adjustment of the mounting plate has not been disturbed during this procedure, axial and transverse adjustment, or seating, of the valve member is not disturbed either during such angular adjustment procedure.

As shown best in FIG. 2, the angular adjustment means for the valve member further include calibration means for precisely determining the angular adjustment of the valve member during the described angular adjustment procedure. Such calibration means include calibrations 142 in degrees provided on a plate 144 attached to the peripheral surface of valve sealing rim 53. An indexing pointer 152 attached to the adjacent rim 74 of rotationally stationary packing gland collar 64 indicates the relative angular positions of these two parts. Thus, the exact number of degrees of rotation of the valve member from a central neutral starting position can be accurately determined. By rotating the valve member about its axis either way from its starting position shown, the position on the drum surface at which vacuum is cut off can be adjusted through several degrees to either side of the centered position to accomodate the maximum angular adjustment of the valve that should be needed.

As shown best in FIG. 5, mounting plate 98 includes a centered arcuate slot 154 in its flange 102. Such slot provides a lifting means for attachment of a lifting sling or hook for lifting the assembly.

The angular adjustment means for the valve member also include valve closure segment 50. As shown in FIG. 6, segment 50 includes arcuate opposite side extension flanges 160, 161 which increase the effective arcuate length of the segment and therefore the number of valve chambers such segment will close and cut off from the vacuum source. The main body 162 of the closure segment 50, shown of fiberglass-coated steel box construction, has an arcuate length of roughly ninety degrees. Each extension flange adds an additional fifteen degrees, giving the segment a total arcuate length of about one hundred twenty degrees.

The extension flanges greatly increase the practical rotational adjustment limits of the valve. The total arcuate length of the closure segment may cover more valve chambers 21 than desired. However, after the closure segment is angularly adjusted to provide, for example, a desired vacuum shutoff position, represented by the free side edge of flange 160 assuming clockwise rotation of the drum, the arcuate length of the segment can be reduced, if necessary, by reducing the arcuate length of flange 161. The free edge of flange 161 represents the angular position where application of vacuum to the drum surface starts. Flanges 160, 161 are made of epoxy resin-coated fiberglass angle members. Once the segment is set at the proper rotational angle, either or both of the flanges can be readily cut to a desired angular length as required to provide the desired valve chamber coverage and vacuum start-stop positions. With each flange having a fifteen degree arc, up to thirty degrees of adjustment in the effective arcuate length of the closure segment is provided.

As will be apparent from FIG. 2, extension segment 56 forms a continuation of only the main body portion 162 of the closure segment 50. The extension segment's cylindrical outer surface 58 has the same arcuate length as that of the conical outer surface of the closure segment at their intersection, that is, about ninety degrees.

The angular extent of elbow segment 78 is only about fifty degrees, substantially less than that of the valve segment. This ensures that the elbow segment will not present any downstream obstructions to discharge flow when the valve member is angularly offset to an extreme in either direction from its centered setting shown. With such difference in the arcuate lengths of the valve and elbow segments, the elbow segment will not extend circumferentially beyond the valve segment, and thus will not present an obstacle to flow, even if the valve closure segment is adjusted up to an extreme twenty degrees in either direction from its position indicated in FIG. 7.

Normally, with the valve closure segment positioned as shown, both ends of valve segment 56 will overlap the corresponding ends of the elbow segment. Thus, the cross sectional area of the flow path in the downstream direction will increase somewhat proceeding from the valve member into the elbow, but without any obstructions to flow in that direction. The foregoing described difference in the angular extent of the valve and elbow segments is illustrated in FIG. 7. The angle 156 represents the angular extent of the elbow segment adjacent the inlet end of the elbow. Angle 158 represents the angular extent of the valve extension segment adjacent the elbow inlet. FIG. 7 also illustrates the relative angular positions of valve segment 56 and elbow segment 78 with the valve angularly in its centered neutral position shown in FIGS. 2, 3, 5 and 6.

Operation and Valve Mounting Procedure

From the foregoing, it will be apparent that the valve-discharge elbow assembly comprises basically four separate elements; valve member 22, discharge elbow 26, mounting plate 98 and clamping ring 57. These elements are assembled, mounted, and adjusted as follows:

First, the mounting plate is slipped over the discharge end of the valve member and the valve member is secured to the mounting plate using clamping ring 57 to apply clamping force to the valve flange 52 by tightening clamping screws 108. For example, valve flange 52 and mounting plate 98 would be connected together with the valve flange set at about a center calibration of calibration plate 144. At this point, the elbow is not connected to the mounting plate.

With the mounting plate and valve flange 52 clamped together, valve shaft 46 is inserted into bearing sleeve 44. Then mounting plate 98 is loosely connected to gear housing 38 using cap screws 100 so that valve closure segment 50 is roughly seated within valve housing 18.

Then, using axial adjusting bolts 120, transverse adjusting bolts 126 and appropriate feeler gauges inserted through the wide open end of the mounting plate and valve member, the valve segment is seated accurately both axially and tranversely within valve housing 18. When the desired adjustment is achieved, cap screws 100 secure the mounting plate to the gear housing 38 in the adjusted position of the plate.

Thereafter, discharge elbow 26 is connected to the mounting plate using cap screws 110 to secure the elbow flange 74 to the opposite side of plate 98 from the valve member. The end face 59 of the valve member extends slightly beyond the corresponding end face of mounting plate 98. Therefore, when cap screws 110 are tightened, valve end face 59 abuts the inlet end face of elbow flange 74, forming a fluid seal at this joint with the help of an O-ring 164.

With the valve-discharge elbow assembly mounted as described, adjusting bolts 70 are inserted through the untapped holes of the elbow flange and mounting plate, and threaded through tapped holes 136 in clamping ring 57 into abutment against packing gland collar 64. The collar, under the urging of bolts 70, push the packing material 25 into fluid sealing engagement between drive trunnion 24 and sealing rim 54 of the valve member.

With the assembly thus mounted and adjusted, the rotary drum filter is ready to be operated. Based on the operating performance of the filter, final angular adjustment of the valve segment 50 can be made, if desired, without disassembling the valve-discharge elbow assembly. To accomplish this, valve flange 52 is simply loosened from its connection with mounting plate 98 by unthreading clamp screws 108 slightly until clamping ring 57 no longer prevents rotation of the valve member about its axis. Then the valve member is rotated on guide surface 62 of the clamping ring or on guide surface 99 of the mounting plate, or both, to a desired new angular setting, as determined by the calibrations 142 on valve sealing rim 53 and indexing pointer 152 on the rim 74 of packing gland collar 64. When the desired new setting has been made, cap screws 108 are retightened to reclamp the valve member to the mounting plate in its new angular setting. During this procedure, mounting plate 98 retains its axial and transverse adjustment because it remains secured to the gear housing, and therefore the valve member rotationally supported on surface 99 of such plate, retains such adjustment also.

When inspection or maintenance of any internal portion of valve member 22 is desired, elbow flange 26 is simply removed from mounting plate 98 by unthreading its connecting screws 110. Mounting plate 98 remains in its adjusted and secured position on gear casing 38, and valve member 22 remains secured to the mounting plate by the clamping ring. With the elbow removed from the mounting plate, there is easy access to the internal portions of the valve member for any desired purpose. When the inspection or maintenance is completed, the elbow is reconnected to the mounting plate 98 using cap screws 110, again without disturbing any prior adjustment of the mounting plate or valve member.

Having illustrated and described the principles of my invention by what is presently a preferred embodiment thereof, it should be apparent to persons skilled in the art that such embodiment may be modified in arrangement and detail without departing from such principles. I claim as my invention such embodiment and all such modifications coming within the true spirit and scope of the following claims, and all equivalents thereof.

I claim:

1. In a rotary drum filter of the type having a vacuum breaker valve housing within one end of the drum and stationary drum support means at the same end of the drum, a vacuum breaker valve-discharge elbow assembly comprising:
    a stationary valve member, including a valve closure segment at an inlet end thereof for insertion in the valve housing of the drum and a valve discharge end including valve connecting means,
    a discharge elbow defining a flow passage therethrough and including elbow inlet and outlet ends, said elbow inlet end including elbow connecting means,
    a valve mounting means positioned between said valve connecting means and said elbow connecting means, said valve mounting means including first connecting means for connecting said mounting means to the drum support means, second connecting means independent of said first connecting means for connecting said mounting means to the valve connecting means, and third connecting means independent of said first and second connecting means for connecting the mounting means to the elbow connecting means, whereby said elbow and said valve member are independently mounted to said mounting means and supported by said mounting means from said drum support means,
    said valve connecting means comprising a clamping means in surrounding relationship to and separable from said valve member for clamping the valve member against said valve mounting means.

2. An assembly according to claim 1 wherein said clamping means includes a clamping surface engagable with a mating surface of said valve member for urging said valve member axially into engagement with said mounting means, and means on at least one of said mounting means and clamping means defining a guide surface for rotational adjustment of said valve member without disturbing such member's transverse adjustment.

3. An assembly according to claim 2 wherein said clamping means comprises a ring-shaped clamping member.

4. An assembly according to claim 1 wherein said second connecting means comprises threaded fastener means connecting said clamping means to said valve mounting means, said clamping means clampingly engaging a radial flange portion of said valve member.

5. An assembly according to claim 1 including valve seating means cooperable with said valve mounting means for axially and transversely adjusting the position of said valve mounting means on said support means while said valve member is connected to said valve mounting means for seating said valve segment within the valve housing.

6. An assembly according to claim 5 including valve adjusting means cooperable with said clamping means and said valve mounting means enabling rotational adjustment of the valve member about its axis on said valve mounting means while said valve member is connected to said valve mounting means and while said valve mounting means remains adjustably connected to said drum support means.

7. An assembly according to claim 5 wherein said valve seating means comprises first threaded adjustment means extending generally axially of said valve member between said valve mounting means and said drum support means for axially adjusting said mounting means on said support means, and second threaded adjustment means extending generally radially of the axis of said valve member between said valve mounting means and said drum support means for transversely adjusting said mounting means on said support means relative to said axis.

8. An assembly according to claim 1 wherein said elbow connecting means comprises an elbow flange integral with said discharge elbow, and said valve mounting means comprises a valve plate means independently connectable to said clamping means, to said elbow flange, and to said support means.

9. An assembly according to claim 8 wherein said valve plate means comprises an annular member in surrounding relationship to a discharge end portion of said valve member.

10. An assembly according to claim 9 wherein the discharge end of said valve member includes a radially extending annular valve flange, said annular member being positioned between said elbow flange and said valve flange, and also being positioned between said elbow flange and said clamping means.

11. An assembly according to claim 8 wherein said first connector means comprises first threaded fasteners for interconnecting said plate and said support means, said second connector means comprises second threaded fasteners for interconnecting said clamping means and said plate means, and said third connector means comprises third threaded fasteners for interconnecting said elbow flange and said plate means.

12. An assembly according to claim 1 including valve seating means for axially and transversely adjusting the position of said valve mounting means on said support means while said valve member is connected to said valve mounting means,
    valve adjusting means for enabling rotational adjustment of the valve member about its axis relative to said valve mounting means while said valve member is connected to said mounting means and said mounting means is connected to said support means, said adjusting means including said clamping means, said clamping means comprising a clamping ring engagable with a valve flange integral with said valve member, said elbow connecting means comprising an elbow flange integral with said discharge elbow, and said valve mounting means comprising a valve plate independently connected to said clamping ring, to said elbow flange, and to said support means, said first connector means comprising first threaded fasteners for interconnecting said plate and said support means, said second connector means comprising second threaded fasteners for interconnecting said clamping ring and said plate, and said third connector means comprising third threaded fasteners for interconnecting said elbow flange and said plate, said valve seating means comprising first threaded adjustment means extending generally axially of said valve member through said plate and into threaded engagement with said support means for axial adjustment of said mounting means relative to said support means, and second threaded adjustment means extending generally radially of the axis of said valve member between said support means and said plate for transversely adjusting said plate relative to said support means, said valve adjusting means comprising an annular guide surface on at least one of said plate and said clamping ring for rotatably supporting said valve member thereby to permit rotational movement of said valve member about its axis relative to said valve mounting plate and clamping ring while said second threaded fastener means interconnect said clamping ring and said mounting plate and while said first threaded fasteners connect said plate to said support means.

13. An assembly according to claim 12 wherein said valve adjusting means includes cooperative calibration means on juxtaposed relatively movable portions of said valve member and another member of said assembly for indicating the angular position of said valve member relative to said other member and thereby facilitating angular adjustment of said valve segment within said valve housing.

14. An assembly according to claim 1 wherein said valve closure segment includes an axial extension segment extending between said closure segment and said valve discharge end to interconnect said closure segment and said discharge end, said elbow including said elbow connecting means including an elbow segment in substantial alignment with and forming a continuation of said valve extension segment, the angular extent of the extension segment being less than the angular extent of said closure segment, and the angular extent of the elbow segment at the inlet end of said elbow being less than the angular extent of the valve extension segment.

15. In a rotary drum filter of the type having a vacuum breaker valve housing within one end of the drum and stationary drum support means at the same end of the drum, a vacuum breaker valve-discharge elbow assembly comprising:

a stationary valve member, including a valve closure segment at an inlet end thereof for insertion in the valve housing of the drum and a valve discharge end including valve connecting means, a discharge elbow defining a flow passage therethrough and including elbow inlet and outlet ends, said elbow inlet end including elbow connecting means, a valve mounting means positioned between said valve connecting means and said elbow connecting means, said valve mounting means including first connecting means for connecting said mounting means to the drum support means, second connecting means independent of said first connecting means for connecting said mounting means to the valve connecting means, and third connecting means independent of said first and second connecting means for connecting the mounting means to the elbow connecting means, whereby said elbow and said valve member are independently mounted to said mounting means and supported by said mounting means from said drum support means, said valve mounting means comprising an annular plate member in surrounding relationship to the discharge end of said valve member, said second and third connecting means cooperating with said plate member to urge the discharge end of said valve member into end-abutting relationship with the inlet end of said elbow.

16. An assembly according to claim 15 wherein said valve connecting means comprises a valve flange spaced rearwardly of said discharge end, said second connecting means including threaded fastener means interconnecting said flange and said plate member.

17. An assembly according to claim 16 wherein said valve flange includes a clamping ring separable from said valve member, said threaded fastener means interconnecting said plate member and said clamping ring, said valve member including an annular valve portion clamped between said plate member and said clamping ring and rotatable about the axis of the valve member and relative to said plate member and ring when loosely clamped therebetween.

18. An assembly according to claim 17 wherein one of said clamping ring and plate member includes an annular guide surface substantially concentric to the axis of said valve member for maintaining transverse adjustment of the valve member during its rotation.

19. An assembly according to claim 15 wherein said valve member includes a valve extension segment forming a rearward continuation of said valve closure segment, said extension segment interconnecting said closure segment and said discharge end, the arcuate extent of said closure segment being greater than the arcuate extent of said extension segment.

20. An assembly according to claim 19 wherein the closure segment includes opposite side flange portions extending arcuately beyond the arcuate side limits of said extension segment to provide said greater arcuate extent.

21. An assembly according to claim 20 wherein said side flange portions are removable from the remainder of said closure segment.

* * * * *